US012767100B2

(12) United States Patent
Davies

(10) Patent No.: US 12,767,100 B2
(45) Date of Patent: Oct. 20, 2026

(54) BRAKING DEVICE

(71) Applicant: Goodrich Actuation Systems Limited, Solihull (GB)

(72) Inventor: Stephen Harlow Davies, Shrewsbury (GB)

(73) Assignee: Goodrich Actuation Systems Limited, Solihull (GB)

( * ) Notice: Subject to any disclaimer, the term of this patent is extended or adjusted under 35 U.S.C. 154(b) by 383 days.

(21) Appl. No.: 18/530,582

(22) Filed: Dec. 6, 2023

(65) Prior Publication Data

US 2024/0190403 A1 Jun. 13, 2024

(30) Foreign Application Priority Data

Dec. 13, 2022 (EP) .................................... 22213225

(51) Int. Cl.
*B60T 8/17* (2006.01)
*B60T 13/66* (2006.01)
*B64C 25/44* (2006.01)

(52) U.S. Cl.
CPC .......... *B60T 8/1703* (2013.01); *B60T 13/662* (2013.01); *B64C 25/44* (2013.01)

(58) Field of Classification Search
CPC ....... B60T 8/1703; B60T 13/662; B64C 25/44
USPC ............... 188/71.5, 134; 192/7, 15; 303/126
See application file for complete search history.

(56) References Cited

U.S. PATENT DOCUMENTS 5,630,490 A * 5/1997 Hudson ................. F16D 43/208 188/134
5,944,148 A * 8/1999 Bae ......................... B64C 13/34 188/134
8,215,471 B2 * 7/2012 Wasser .................... F16D 67/00 188/134
9,255,632 B2 2/2016 Finney
9,616,990 B2 * 4/2017 Barger .................. F16D 43/206
9,651,126 B2 5/2017 Lang et al.
10,428,881 B2 * 10/2019 Bae ......................... F16D 65/22
(Continued)

FOREIGN PATENT DOCUMENTS

DE 102016002468 A1 8/2017
EP 0727594 B1 6/2000

OTHER PUBLICATIONS

Abstract of DE102016002468 (A1), Published: Aug. 31, 2017, 1 page.

(Continued)

*Primary Examiner* — Christopher P Schwartz
(74) *Attorney, Agent, or Firm* — Kilpatrick Townsend & Stockton LLP

(57) ABSTRACT

A braking device for a flight control system includes a drive shaft for applying a drive torque to a flight control surface. The braking device comprises a housing component comprising a first braking surface. The system also includes a trolley having a second braking surface configured to contact the first braking surface to provide a braking torque. The trolley is configured to receive an input torque from the drive shaft, wherein the trolley is configured to apply a contact force between the first and second braking surfaces in response to the input torque. Also provided is a flight control system comprising the braking device and a drive shaft for applying a drive torque to a flight control surface, and an aircraft comprising the flight control system.

12 Claims, 5 Drawing Sheets

(56) References Cited

U.S. PATENT DOCUMENTS

| | | | |
|---|---|---|---|
| 10,935,115 | B2 | 3/2021 | Barger et al. |
| 2016/0016653 | A1 | 1/2016 | Barger |
| 2017/0261048 | A1 | 9/2017 | Bae |
| 2019/0128343 | A1 | 5/2019 | Davies |

OTHER PUBLICATIONS

European Search Report for Application No. 22213225.0, mailed May 22, 2023, 7 pages.

* cited by examiner

BRAKING DEVICE

CROSS REFERENCE TO RELATED APPLICATIONS

This application claims priority to European Patent Application No. 22213225.0 filed Dec. 13, 2022, the entire contents of which is incorporated herein by reference.

TECHNICAL FIELD

This disclosure relates to a braking device for an aircraft, a flight control system comprising the braking device and an aircraft comprising the flight control system and the braking device.

BACKGROUND

Aircraft are typically equipped with flight control systems to control various surfaces during the operation of the aircraft. The flight control systems may include braking functions that are utilised to provide a safe operating condition in the event of a failure within a flight control system.

Existing braking devices may use a combination of conventional brake discs and sets of springs. The devices are typically designed to provide a minimum braking torque to ensure that all failure cases are enveloped. This design philosophy drives the number of braking disc required and the size of associated compression springs, which in turns drives both the weight of the braking device and the magnitude of drag torque occurring at cold temperature.

SUMMARY

According to a first aspect, there is provided a braking device for a flight control system, the flight control system comprising a drive shaft for applying a drive torque to a flight control surface. The braking device includes: a housing component comprising a first braking surface; and a trolley comprising a second braking surface configured to contact the first braking surface to provide a braking torque. The trolley is configured to receive an input torque from the drive shaft and to apply a contact force between the first and second braking surfaces in response to the input torque.

By configuring the trolley to apply the contact force in response to receiving the input torque, the braking device can be configured to generate a braking torque of magnitude necessary to envelope (i.e. match and exceed where necessary) the input torque. Additionally, the braking device is simplified with fewer components required to generate a required braking torque. This means that there is less chance of failure with fewer components in the device.

The trolley may be configured such that applying the input torque to the trolley causes the trolley to apply the contact force between the first and second braking surfaces.

The trolley may be configured to increase a contact force between the first and second braking surfaces in response to an increase in the input torque.

The braking torque can thus increase as input torque increases providing a device with variable braking capacity. The braking torque increases as contact pressure increases which prevents slipping.

The trolley may be configured to axially displace in response to the input torque to apply the contact force between the first and second braking surface.

The trolley is a movable component in the braking device which may be axially displaced in response to the input torque. The housing may be fixed and, as such, there is provided a reliable braking device with the trolley being the movable component.

The trolley may be configured to apply the contact force in response to the input torque being received in a first direction and in a second direction, the second direction opposite to the first direction.

The trolley may comprise a torque receiver. The torque receiver may be configured to receive the input torque from the drive shaft, the input torque causing the torque receiver to apply a force to the trolley such that the trolley applies the contact force between the first and second braking surfaces.

The torque receiver comprises a first inclined surface configured to receive the input torque from a second inclined surface arranged on the drive shaft.

The torque receiver may comprise a plurality of first inclined surfaces configured to receive the input torque from a plurality of second inclined surfaces arranged on the drive shaft.

The plurality of first inclined surfaces may comprise an opposing first inclined surface. The opposing first inclined surface may be angled in an opposing direction to the first inclined surface. The opposing first inclined surface may be configured to receive the input torque from an opposing second inclined surface arranged on the drive shaft. By having surfaces angled in opposing directions, the torque receiver may be able to receive torque in the first direction and in the opposing, second direction (e.g. clockwise and anti-clockwise), with a braking torque applied in both cases.

The trolley may comprise a plurality of torque receivers. The plurality of torque receivers may be radially distributed around the trolley.

The trolley may be configured to axially displace in response to relative angular displacement of the second inclined surface with respect to the first inclined surface.

The trolley may axially displace to bring the second braking surface into contact with the first in order to provide a braking torque. As such, the geometry of the torque receiver may be easily tuned as required to provide the required braking torque. Tuning may include, for example changing the angles, the shapes, or the sizes of the inclined surfaces or ball ramps during manufacture.

The axial force increases with axial displacement of the trolley, increasing a contact force at the torque receiver and preventing slipping.

An intermediate rolling contact component may be arrangeable between the first and second inclined surfaces and be arranged to be displaced between the first and second inclined surfaces in response to relative angular displacement of the second inclined surface with respect to the first inclined surface.

The intermediate rolling contact component may be a ball.

The intermediate rolling contact component may generate a greater axial displacement of the trolley, thus generating a greater contact force between the first and second braking surfaces. Use of an intermediate rolling contact component means fine tuning is easier to get the desired braking torque across the braking device. By providing a rolling contact surface, surface wear will be reduced and frictional losses will be reduced.

The trolley may be axially displaceable between a first and second position, wherein, in the first position, the second braking surface contacts the first braking surface and, in the second position, the first braking surface is spaced from the second braking surface.

The braking device may comprise a bias element, the bias element configured to apply a force to the trolley to axially displace the trolley towards the first position.

In the first position, the braking device generates a braking torque, while in the second position, there is no contact between the first and second braking surfaces and, as such, there is no braking torque. The trolley may be biased towards the first position where a braking torque is generated. This allows the braking device to function suitable as a secondary, or back up, braking device.

The trolley may be configured to maintain itself in the first position in response to the input torque.

The trolley may be maintained in the first position, wherein a braking torque is generated, as long as an input torque is provided. The bias element does not need to maintain the trolley in the first position, so the bias element can be smaller than in conventional systems.

The braking device may further comprise an actuator, the actuator being actuatable to move the trolley to the second position.

The actuator may be a linear actuator.

The actuator may be a hydraulic actuator.

The actuator may be configured to displace the trolley such that there is no contact between the first and second braking surfaces. This means that, when actuated, the braking device is not generating a braking torque. As such, the braking device may be in this position during normal operation of the aircraft, when a secondary braking device is not required.

The first and second braking surfaces may be conical. The first and second braking surface may be planar and/or convex.

The first and second braking surfaces may be inclined at an angle of between 14 and 40 degrees. The torque receiver may be inclined at an angle between 10 and 30 degrees.

The first braking surface may be radially separated from a rotational axis of the shaft by a first distance R1 and the torque receiver may be radially separated from the rotational axis of the shaft a second distance R2, wherein R1 is typically greater than R2.

The inclined angles of the first and second braking surfaces, the inclined angles of the torque receiver and the ratio of radii R1 and R2 may be tuned to provide the required gain, which may be in the range of 1.2 to 5.

According to a second aspect, there is provided a flight control system comprising the braking device as described above and a drive shaft for applying a drive torque to a flight control surface, the drive shaft comprising a second inclined surface of the torque receiver.

The flight control surface may comprise a slat surface.

The braking device may be configured to hold the slat surface in a predetermined position.

The braking device may be suitable for acting to provide a braking torque on a flight control surface, for example as a secondary braking device to hold the slat surface in a braking position should the primary brake system fail.

According to a third aspect, there is provided an aircraft comprising the flight control system as described above.

The aircraft may comprise a pair of wings, wherein the braking device is disposed at a distal end of each wing.

BRIEF DESCRIPTION OF THE DRAWINGS

Various embodiments will now be described, by way of example only, and with reference to the accompanying drawings, in which.

DETAILED DESCRIPTION

Figure 1:
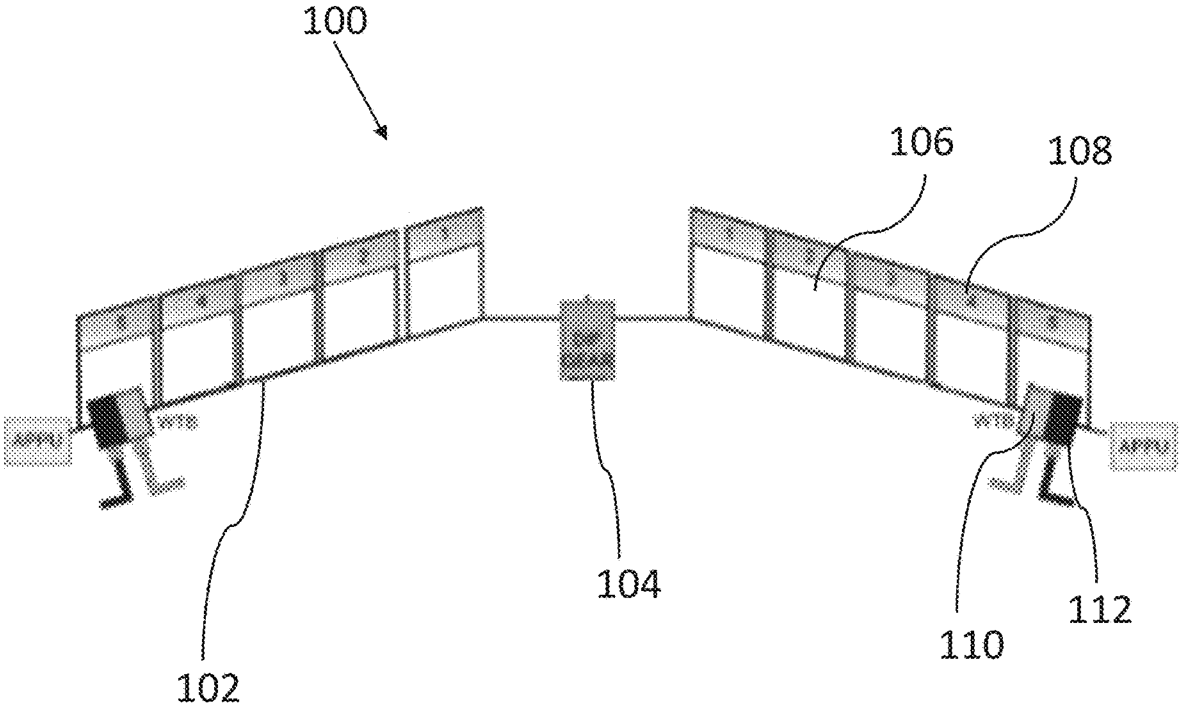
FIG. 1 shows a schematic of the layout of an aircraft wing.

With reference to FIG. 1, a schematic layout of a flight control system 100 for controlling parts of the operation of an aircraft is shown. The flight control system 100 comprises, among other features, a drive shaft 102 which extends along the length of a wing of an aircraft. The system 100 also comprises a gear box 104 connected to the drive shaft 102 and arranged to receive a torque from an electro-mechanical actuator (e.g. a motor, not shown). The gear box 104 provides a torque to the drive shaft 102.

The wing has a flight control surface 106 which may comprise flaps and/or slat surfaces 108. These are lowered and raised to control the aircraft during flight and may be locked in a raised position by a braking device 110. The flight control system 100 comprises a braking device 110, which is typically located at a distal end of the aircraft wing, away from the fuselage. The drive shaft 102 provides a drive torque to the flight control surface 106 to adjust or maintain an angle of the flight control surface 106 to control the aircraft during flight.

The braking device 110 is arranged to react to the torque received from the drive shaft 102. The braking device 110 is arranged to maintain a position of the flight control surface in the event that the hydraulic or electrical supply to the system is shut off, for example in the event of a failure of one of more primary systems of the aircraft.

An asymmetry position pickoff unit (APPU) 112 may also be provided adjacent the braking device 110. The APPU 112 positioned at the distal end of the drive shaft 102 to monitor angular position of the drive shaft 102.

Figure 2:
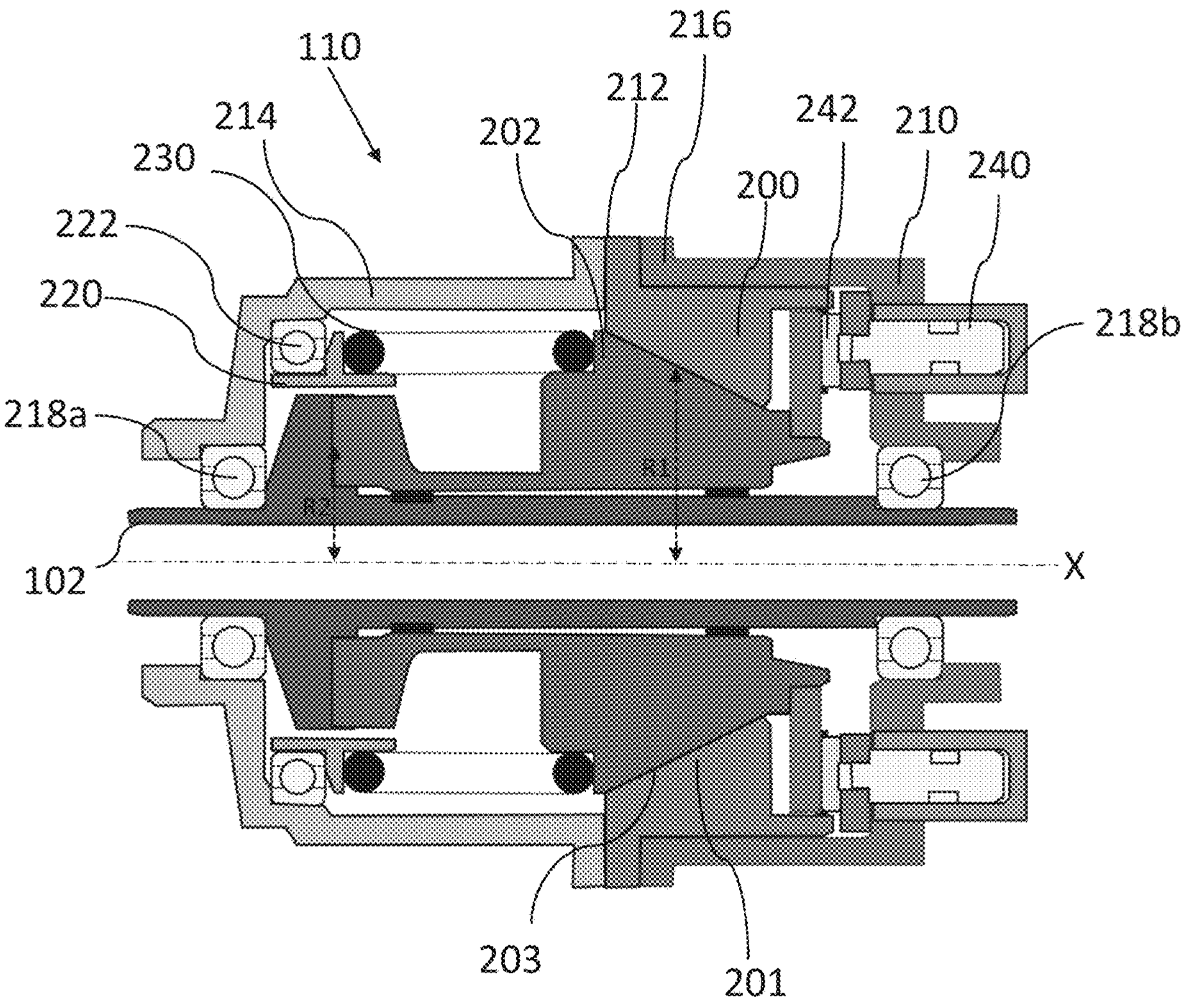
FIG. 2 shows a cross-sectional schematic drawing of a braking device in a first position.

FIG. 2 shows a braking device 110 in accordance with an aspect of the invention. The braking device 110 is shown in a first position, as described in more detail below. The braking device 110 comprises a housing component 200 and a trolley 202. The housing component 200 comprises a first braking surface 201. The trolley 202 comprises a second braking surface 203.

The housing component 200 is part of a larger housing 210 of the braking device 110. The housing 210 is a rigid body. The housing 210 (including the housing component 200) is fixed to the aircraft wing, such that the housing 210 does not displace relative to the aircraft. The housing may be comprised of steel and may incorporate a specialty braking interface material such as Kevlar or a specialty braking interface surface such as a high velocity oxygen fuel (HVOF) coating. The housing 210 surrounds the components of the braking device 110 to retain various internal elements of the braking device 110 therein. There is a split line 212 in the housing to allow for assembly of the braking device 110. The housing 210 comprises a first housing body 214 and a second housing body 216, which are separated by the split line 212. The first housing body 214 and the second housing body 216 are fixed together at the split line 212 by bolts.

The split line 212 means that the trolley 202 may be disposed within the housing 210 during manufacture, with the trolley 202 being received in the housing 210 before the first housing body 214 and the second housing body 216 are fixed together.

The trolley 202 is in contact with the drive shaft 102 of the flight control system at a torque receiver 250, as described below. The drive shaft 102 provides an input torque to the braking device 110. The drive shaft 102 extends into the housing 210. The drive shaft 102 is rotatably fixed to the housing 210 by shaft bearings 218*a* 218*b*.

The trolley 202 is comprised of a rigid material. For example, the trolley 202 may be comprised of steel or composite construction. The trolley 202 is axially movable with respect to the longitudinal axis of the drive shaft. The trolley 202 is received entirely within the housing 210.

A bias element 230 is provided. In the present example, the bias element 230 is a spring. The bias element 230 is in contact at a first end to the trolley 202. The bias element 230 is in contact at a second end to a bias element support 220. The bias element support 220 is in turn rotatably fixed to the housing 210 by a trolley bearing 222. This permits the bias element support 220 and the bias element 230 to rotate with the trolley 202 in use. The bias element support 220 is under compression between the trolley 202 and the bias element support 220.

The bias element 230 is configured to apply a force to the trolley 202 in the axial direction (i.e. parallel to the longitudinal axis of the drive shaft 102). The force applied to the trolley 202 is an axial force arranged to bias the second braking surface 203 of the trolley towards the first braking surface 201 of the housing component 200. In response to the force applied to the trolley 202 by the bias element 230, the trolley 202 is axially displaced such that the second braking surface 203 contacts the first braking surface 201 of the housing 200.

Figure 3A:
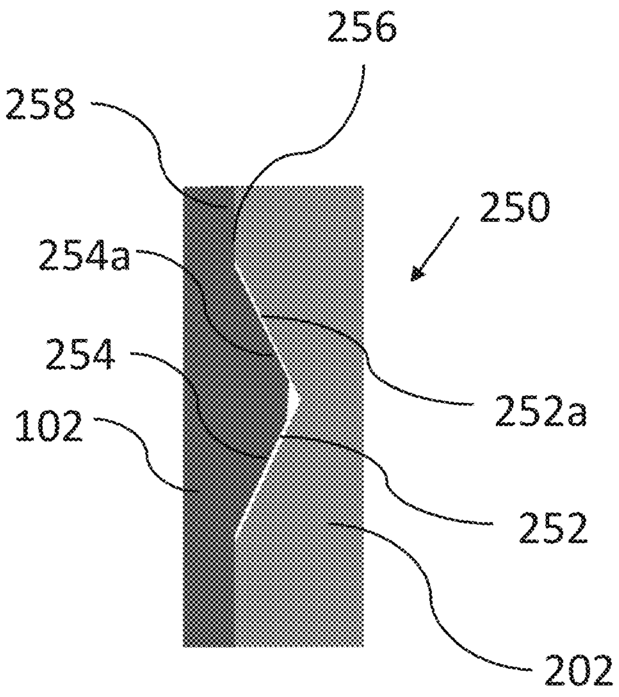
FIGS. 3*a* and 3*b* show schematic drawings of a torque receiver from a radial direction.

The trolley 202 comprises a torque receiver 250. The torque receiver 250 is shown in FIG. 3*a*, in a first position. FIG. 3*a* shows the torque receiver 250 from a radially inward direction i.e. towards the longitudinal axis of the input shaft 102. The torque receiver 250 comprises a first inclined surface 252. The first inclined surface 252 is arranged to contact a second inclined surface 254 (forming part of the drive shaft 102) to receive an input torque from the second inclined surface 254, thereby permitting the trolley 202 to receive the input torque from the drive shaft 102.

The first inclined surface 252 is inclined relative to an axial plane (with the axial plane defined as normal to the longitudinal axis of the drive shaft 102). The second inclined surface 254 is similarly inclined with respect to the radial plane. The first and second inclined surfaces 252 254 are substantially parallel to each other. The first and second inclined surfaces 252 254 are planar and extend in the radial direction. The first and second inclined surfaces 252 254 form a ramp actuator.

The trolley 202 comprises three such torque receivers 250, which are circumferentially displaced about the longitudinal axis. In between the torque receivers 250 the trolley 202 comprises axial surfaces 256, which are parallel to the axial plane of the drive shaft 102. The axial trolley surfaces 256 face corresponding axial drive shaft surfaces 258 on the drive shaft 102.

In the first position, there is no angular displacement between the trolley 202 and the drive shaft 102. This means that the first inclined surface 252 is fully in contact with the second inclined surface 254. Additionally, the axial trolley surfaces 256 are in contact with the axial drive shaft surface 258.

Figure 3B:
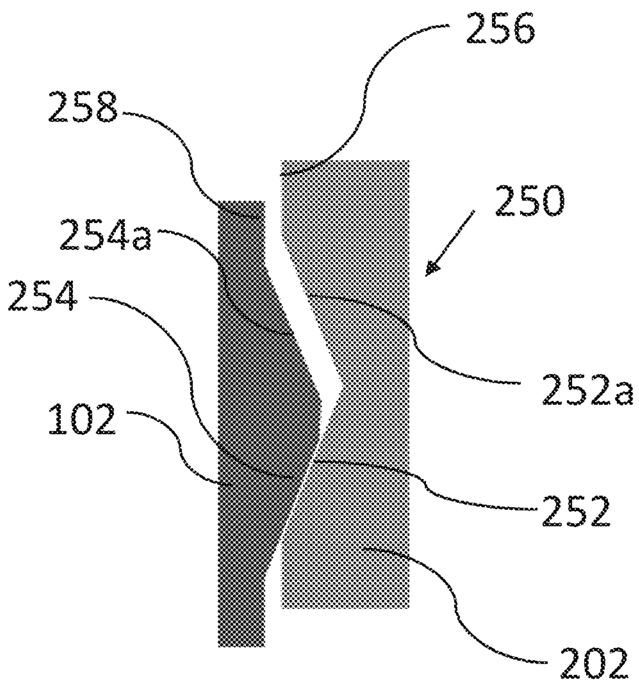

Referring to FIG. 3*b*, the torque receiver 250 is shown in a second position. The input torque from the drive shaft 102 and contact between the first and second braking surfaces 201 203 (as described below) causes a relative angular displacement of the input shaft 102 relative to the trolley 202, and hence the second inclined surface 254 with respect to the first inclined surface 252. This causes the contact between the first and second inclined surfaces 252 254 to shift, such that the second inclined surface 254 slides along the first inclined surfaces 254. The incline of the first and second inclined surfaces 252 254 causes the axial trolley surfaces 256 to move out of the contact with the axial drive shaft surfaces 258. This in turn causes axial displacement of the trolley 202 relative to the input shaft 102 in response to the relative angular displacement of the first 252 and second 254 inclined surfaces.

The axial displacement of the trolley 202 is in the direction towards the housing component 200. This means that the second braking surface 203 is displaced towards the first braking surface 201 such that there is a contact force therebetween, with the first and second braking surfaces 201 203 in contact in the first position as in FIG. 2.

As a result of the contact force between the first braking surface 201 and the second braking surface 203, and as described in more detail below, a braking torque is provided by the first and second braking surfaces 201 203.

The angles of the inclined surfaces may be chosen to give the required axial displacement to get a desired contact force and braking torque in the braking device. The angles may be tuned to achieve the optimal axial displacement.

In addition to the first inclined surface 252, each torque receiver 250 comprises an opposing first inclined surface 252*a*. The opposing first inclined surface 252*a* is angled in an opposing direction (from the axial plane) to the first inclined surface 252. The drive shaft 102 comprises a corresponding opposing second inclined surface 254*a*. This means that when the input torque is applied from the drive shaft 102 in the opposite direction to that depicted in FIG. 3*b*, the opposing first inclined surface 252*a* and the opposing second inclined surface 254*a* contact each other and slide relative to each other to cause the axial displacement of the trolley 202. As such, braking torque can be provided in response to an input torque in either direction on the drive shaft 102. The first inclined surface 252 meets the opposing first inclined surface 252*a* at a radially extending edge.

The braking device 110 comprises an actuator 240. The actuator 240 is arranged within the housing 210. The actuator 240 may be integrated with the housing 210. The actuator 240 may be a hydraulic actuator, a pneumatic actuator or an electromechanical actuator. The actuator 240 may be a linear actuator. The actuator is arranged to counter the biasing force provided by the bias element 230, to push the trolley 202 towards a second position, as described below.

Figure 4:
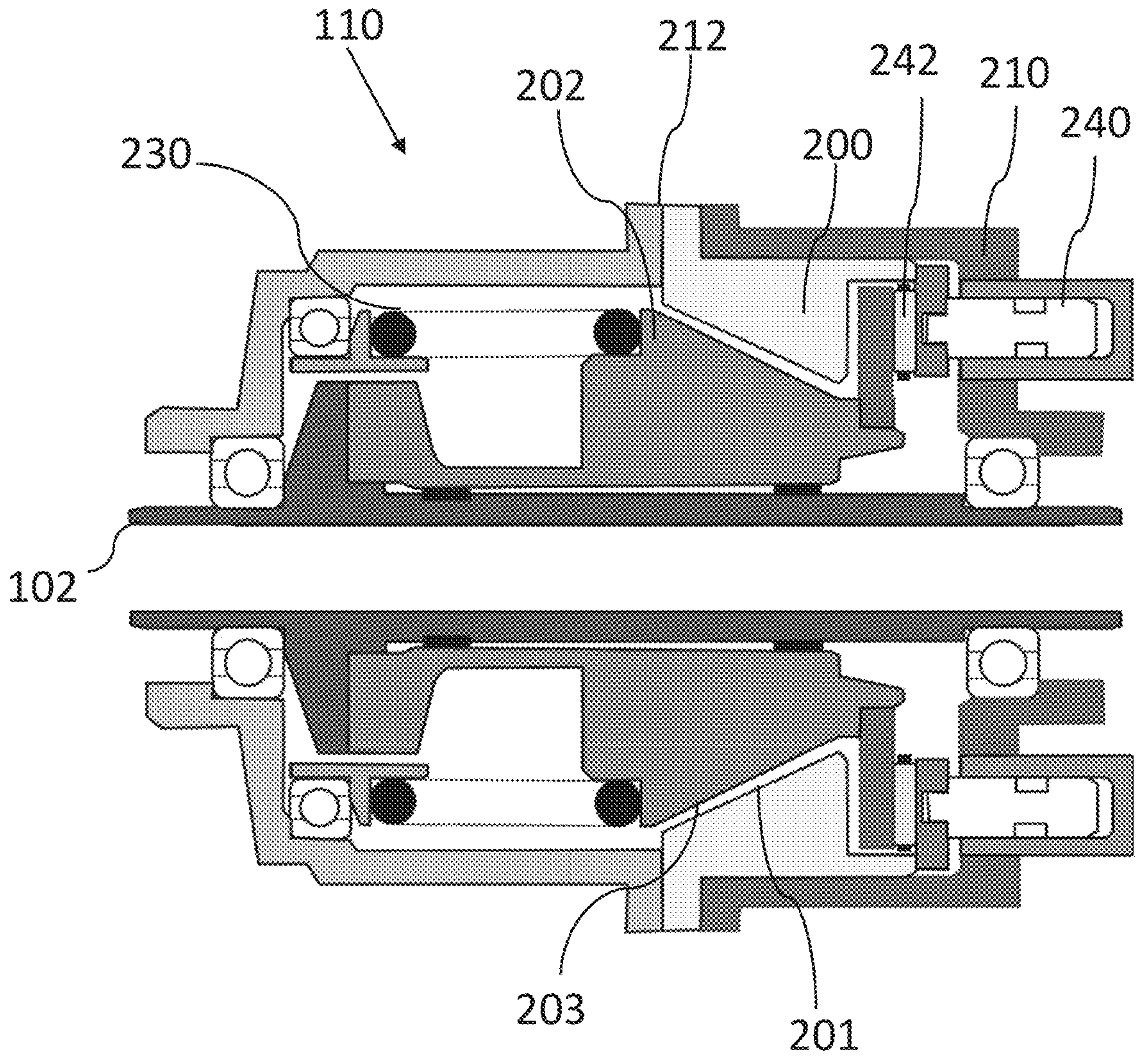
FIG. 4 shows a cross-sectional schematic drawing of the braking device in a second position.

Referring to FIG. 4, from which some reference numerals are omitted for clarity, the braking device 110 is shown in the second position. When power is input to the actuator 240, the actuator pushes the trolley 202 away from the housing component 200.

The actuator 240 contacts the trolley 202 via intermediate housing components 242. The actuator 240 is configured to overcome the biasing force applied from the bias element 230.

Actuation of the actuator 240 causes the trolley 202 to displace such that the second braking surface 203 is spaced apart from the first braking surface 201. This means that, in the second position, there is no contact force between the trolley 202 and the housing 200. Therefore, there is no braking torque applied to the braking device 110.

In use, when power is supplied, the braking device 110 is in the second position as shown in FIG. 4. In the second position, the second braking surface 203 is spaced apart from the first braking surface 201. The torque receiver 250 is in the first position as shown in FIG. 3*a*. The braking device 110 is configured to be in the second position during normal operation of the aircraft, when braking is not required.

The actuator 240 receives an input of power and displaces the trolley 202 away from the housing component 200. The trolley 202 rotates freely with the drive shaft 102 relative to the housing 210, as the drive shaft 102 rotates as required to move the flight control surface 106.

When power to the system is off, the actuator 240 is deactivated. In response to deactivation of the actuator 240, the biasing force from the biasing element 230 is no longer overcome, so the biasing element 230 applies a force to the trolley 202 to displace the trolley towards the first position, as shown in FIG. 2. The displacement provided by the bias element 230 brings the second braking surface 203 of the trolley into contact with the first braking surface 201 of the housing component 200.

An input torque continues to be applied by the drive shaft 102. The contact between the first and second braking surfaces 201 203 provides a braking torque in response to the input torque, which causes slipping at the torque receiver 250. The torque receiver 250 therefore moves from its first position to the second position of FIG. 3*b*. As described above, in the second position the trolley is axially displaced. The first inclined surface 252 receives the input torque from the second inclined surface 254 arranged on the drive shaft, which applies an axial force to the trolley 202. The axial force increases with axial displacement of the trolley 202, increasing a contact force at the torque receiver 250 and preventing further slipping and angular displacement of the torque receiver 250.

The balance between the axial forces on the trolley 102 (from the torque receiver 250 and at the second braking surface 203) means that the trolley 102 is held in equilibrium when it is in the first position. The trolley 102 is thereby configured to maintain itself in the first position in response to the input torque provided by the drive shaft 102. The contact force between the first braking surface 201 and the second braking surface 203 is maintained as the torque is continuously applied form the drive shaft 102.

This means that the bias element 230 needs only provide the initial displacement of the trolley 202 towards the housing component 200, during which only frictional forces (e.g., in the actuators 240) need to be overcome. The bias element 230 therefore does not need to maintain the trolley 202 in its first position, which means that the bias element 230 can be significantly smaller than in conventional systems.

As the input torque increases, the axial force developed at the torque receiver 250 increases, which in turn increases the contact force between the first and second braking surfaces 201 203, increasing braking torque.

In order to move the trolley 102 back to the second position, the actuator is activated. The actuator may be sized to provide an axial load greater than that developed by the torque receiver, in order to axial move the trolley to the first position. The sizing of the actuator is dependent upon the architecture of the flight control system in question and may range from a magnitude governed by the stall capability of the system drive unit, to a magnitude governed by the feedback torque from aero-loads, to a magnitude governed by the bias element 230.

Figure 5A:
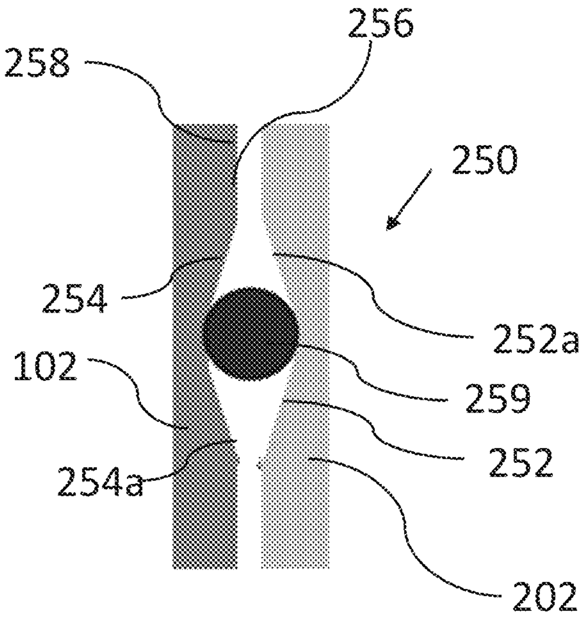
FIGS. 5*a* and 5*b* show schematic drawings of a torque receiver from a radial direction.
Figure 5B:
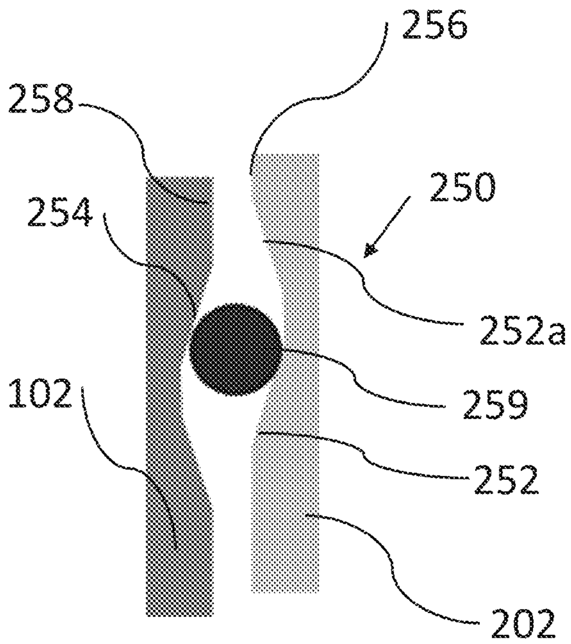

As shown in FIGS. 5*a* and 5*b*, an intermediate rolling component 259 may be arranged between the first inclined surface of the torque receiver 250 and the second 254 inclined surfaces arranged on the drive shaft 102. The intermediate rolling component may be, for example, a ball 259. The ball 259 may be arranged to be displaced between the first 252 and second 254 inclined surfaces in response to relative angular displacement of the second inclined surface 254 with respect to the first inclined surface 252. The ball 259 may provide a larger axial displacement of the trolley 202 and, as such a larger contact force may be applied. The intermediate rolling component 259 may allow for better tuning of the brake to achieve contact force and resultant braking torque. The arrangement of FIGS. 5*a* and 5*b* comprises all of the features of that of FIGS. 3*a* and 3*b*, and repeated description of those features is omitted.

The gain of the brake (i.e., the ratio of the braking torque to the input torque) may be calculated using the angles of the first braking surface 201 and the second braking surface 203, the coefficient of friction therebetween, and the relative distances of the first and second braking surface from a rotational axis of the shaft.

Typically, the required gain is at least 1.2. When a gain of less than 1 is provided, the brake may apply a drag to the drive shaft 102 but does not provide an enveloping braking action.

The first 252 and second 254 braking surfaces may be inclined at an angle of between 14 and 40 to the axis X of the input shaft. This provides an optimal contact force therebetween. The first and second inclined surfaces of the torque receiver may be inclined at an angle between 10 and 30 degrees to the axial plane.

The first braking surface may be radially separated from a rotational axis of the shaft by a first distance R1 and the torque receiver may be radially separated from the rotational axis X of the shaft a second distance R2, wherein R1>R2. Typically, it is desirable to have a larger first distance R1 than second distance R2 so that the ratio provides a positive factor to the overall gain of the unit.

Various aspects of the braking device disclosed in the various embodiments may be used alone, in combination, or in a variety of arrangements not specifically discussed in the embodiments described in the foregoing and this disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from the invention in its broader aspects. The scope of the following claims should not be limited by the embodiments set forth in the examples, but should be given the broadest reasonable interpretation consistent with the description as a whole.

The invention claimed is:

1. A braking device for a flight control system, the flight control system comprising a drive shaft for applying a drive torque to a flight control surface, the braking device comprising:

a housing component comprising a first braking surface; and a trolley comprising a second braking surface configured to contact the first braking surface to provide a braking torque, wherein the trolley is configured to receive an input torque from the drive shaft, and wherein the trolley is configured to apply a contact force between the first and second braking surfaces in response to the input torque;

wherein the trolley is configured to axially displace in response to the input torque to apply the contact force between the first and second braking surface such that the trolley is axially displaceable between a first and second position, wherein, in the first position, the second braking surface contacts the first braking surface and, in the second position, the first braking surface is spaced from the second braking surface; and wherein braking device further comprises a bias element, the bias element configured to apply a force to the trolley to axially displace the trolley towards the first position.

2. The braking device of claim 1, wherein the trolley comprises a torque receiver, wherein the torque receiver comprises a first inclined surface configured to receive the input torque from a second inclined surface arranged on the drive shaft.

3. The braking device of claim 2, wherein the trolley is configured to axially displace in response to relative angular displacement of the second inclined surface with respect to the first inclined surface.

4. The braking device of claim 2, further comprising an intermediate rolling contact component arrangeable between the first and second inclined surfaces and arranged to be displaced between the first and second inclined surfaces in response to relative angular displacement of the second inclined surface with respect to the first inclined surface.

5. The braking device of claim 2, wherein the torque receiver comprises an opposing first inclined surface, the opposing first inclined surface configured to receive the input torque from an opposing second inclined surface arranged on the drive shaft.

6. A flight control system comprising:

a braking device of claim 1; and the drive shaft for applying the drive torque to the flight control surface, the drive shaft comprising a second inclined surface of the torque receiver.

7. An aircraft comprising:

a flight control system of claim 6.

8. The braking device of claim 1, wherein the trolley is configured to increase a contact force between the first and second braking surfaces in response to an increase in the input torque.

9. The braking device of claim 1, wherein the trolley is configured to apply the contact force in response to the input torque being received in a first direction and in a second direction, wherein the second direction is opposite to the first direction.

10. The braking device of claim 1, wherein the trolley is configured to maintain itself in the first position in response to the input torque.

11. The braking device of claim 1, wherein the first and second braking surfaces are conical.

12. A braking device for a flight control system, the flight control system comprising a drive shaft for applying a drive torque to a flight control surface, the braking device comprising:

a housing component comprising a first braking surface; and a trolley comprising a second braking surface configured to contact the first braking surface to provide a braking torque, wherein the trolley is configured to receive an input torque from the drive shaft, and wherein the trolley is configured to apply a contact force between the first and second braking surfaces in response to the input torque;

wherein the trolley is configured to axially displace in response to the input torque to apply the contact force between the first and second braking surface such that the trolley is axially displaceable between a first and second position, wherein, in the first position, the second braking surface contacts the first braking surface and, in the second position, the first braking surface is spaced from the second braking surface; and the braking device further comprising an actuator, the actuator actuatable to move the trolley to the second position.

* * * * *